(12) United States Patent
Darrow et al.

(10) Patent No.: US 10,401,880 B2
(45) Date of Patent: Sep. 3, 2019

(54) HYDRAULIC FUEL PUMP APPARATUS FOR A FUEL DELIVERY CHASSIS, SUITABLE FOR REFUELING AIRCRAFT, AND RELATED DEVICES, SYSTEMS AND METHODS

(71) Applicant: Beta Fluid Systems, Inc., Reidsville, NC (US)

(72) Inventors: Clifford Glenn Darrow, Kernersville, NC (US); Jonathan Edmund DeLine, Oak Ridge, NC (US)

(73) Assignee: BETA FLUID SYSTEMS, INC., Reidsville, NC (US)

( * ) Notice: Subject to any disclaimer, the term of this patent is extended or adjusted under 35 U.S.C. 154(b) by 0 days.

(21) Appl. No.: 16/168,041

(22) Filed: Oct. 23, 2018

(65) Prior Publication Data

US 2019/0056754 A1    Feb. 21, 2019

Related U.S. Application Data

(63) Continuation of application No. 14/204,691, filed on Mar. 11, 2014, now Pat. No. 10,108,204.
(Continued)

(51) Int. Cl.
*F04B 49/10*        (2006.01)
*G05D 7/06*         (2006.01)
(Continued)

(52) U.S. Cl.
CPC .............. *G05D 7/0629* (2013.01); *B64F 1/28* (2013.01); *F03C 1/26* (2013.01); *F04B 17/05* (2013.01);
(Continued)

(58) Field of Classification Search
None
See application file for complete search history.

(56) References Cited

U.S. PATENT DOCUMENTS 2,815,767 A    12/1957 Kurns
3,252,322 A     5/1966 Pring
(Continued)

OTHER PUBLICATIONS

International Search Report and Written Opinion for PCT/US2014/023484, dated Jul. 7, 2014, 11 pages.
(Continued)

*Primary Examiner* — Robert E Fennema
*Assistant Examiner* — Marzia T Monty
(74) *Attorney, Agent, or Firm* — Withrow & Terranova, PLLC

(57) ABSTRACT

Embodiments include a modular fuel pump apparatus for an aircraft refueling chassis and related devices, systems and methods. In one exemplary embodiment, a pump module includes a hydraulic motor driven by a hydraulic pump connected to a chassis motor. A chassis engine is operated at a substantially constant RPM, which causes the hydraulic pump to output hydraulic fluid to the pump module at a substantially constant hydraulic pressure. The speed of the hydraulic motor can be varied by a proportional flow control valve disposed between the hydraulic pump and the hydraulic motor, thereby varying the speed of the fuel pump and the flow rate of the fuel. A controller is configured to operate the pressure control valve such that the flow of the fuel is maintained at a predetermined flow rate.

22 Claims, 6 Drawing Sheets

Related U.S. Application Data

(60) Provisional application No. 61/776,459, filed on Mar. 11, 2013.

(51) Int. Cl.
    *B64F 1/28*     (2006.01)
    *F04B 17/05*     (2006.01)
    *F04B 49/06*     (2006.01)
    *F04B 49/22*     (2006.01)
    *F03C 1/26*     (2006.01)

(52) U.S. Cl.
    CPC ............ *F04B 49/06* (2013.01); *F04B 49/106* (2013.01); *F04B 49/22* (2013.01)

(56) References Cited

U.S. PATENT DOCUMENTS

| | | | |
|---|---|---|---|
| 4,272,089 A | 6/1981 | Watkins, Jr. | |
| 4,394,027 A * | 7/1983 | Watkins, Jr. | ............ B60P 3/225 |
| | | | 137/351 |
| 4,913,089 A | 4/1990 | Atkins et al. | |
| 4,987,013 A * | 1/1991 | Atkins | ................. F04B 15/023 |
| | | | 118/318 |
| 5,490,539 A | 2/1996 | Ottestad | |
| 5,719,781 A | 2/1998 | Leatherman et al. | |
| 6,470,233 B1 | 10/2002 | Johnson, Jr. | |
| 7,327,045 B2 | 2/2008 | Watkins | |
| 7,607,296 B2 * | 10/2009 | Ohigashi | ............... E02F 9/2235 |
| | | | 60/431 |
| 8,196,399 B1 | 6/2012 | Hauser et al. | |
| 2010/0212306 A1 | 8/2010 | Batenburg | |
| 2010/0329892 A1 | 12/2010 | Brantley et al. | |
| 2011/0048572 A1 | 3/2011 | Batson et al. | |
| 2013/0007650 A1 | 1/2013 | Van Hoy et al. | |
| 2013/0253711 A1 | 9/2013 | McLoughlin et al. | |
| 2014/0257579 A1 | 9/2014 | Darrow et al. | |

OTHER PUBLICATIONS

International Preliminary Report on Patentability for PCT/US2014/023484, dated Sep. 24, 2015, 8 pages.
Non-Final Office Action for U.S. Appl. No. 14/204,691, dated Oct. 20, 2016, 41 pages.
Final Office Action for U.S. Appl. No. 14/204,691, dated Mar. 28, 2017, 39 pages.
Non-Final Office Action for U.S. Appl. No. 14/204,691, dated Oct. 13, 2017, 51 pages.
Notice of Allowance for U.S. Appl. No. 14/204,691, dated Jun. 22, 2018, 15 pages.

* cited by examiner

HYDRAULIC FUEL PUMP APPARATUS FOR A FUEL DELIVERY CHASSIS, SUITABLE FOR REFUELING AIRCRAFT, AND RELATED DEVICES, SYSTEMS AND METHODS

PRIORITY APPLICATIONS

The present application is a continuation of, and claims the benefit of priority to, U.S. patent application Ser. No. 14/204,691 filed on Mar. 11, 2014 entitled "Hydraulic Fuel Pump Apparatus for a Fuel Delivery Chassis, Suitable for Refueling Aircraft, and Related Devices, Systems and Methods," issued as U.S. Pat. No. 10,108,204, which claims the benefit of priority to U.S. Patent Application Ser. No. 61/776,459 filed on Mar. 11, 2013 entitled "Hydraulic Fuel Pump Apparatus For A Fuel Delivery Chassis, Suitable For Refueling Aircraft, And Related Devices, Systems And Methods," both of which are incorporated herein by reference in their entireties.

BACKGROUND

Field of the Disclosure

The technology of the disclosure relates to a hydraulic fuel pump apparatus for a fuel delivery chassis, such as an aircraft fuel delivery vehicle.

Technical Background

Fuel pumps and fuel dispensers are used to dispense fuel to vehicles and other equipment requiring fuel for operation. The basic components of a fuel dispenser are as follows. The fuel dispenser contains a fuel conduit that receives fuel from a fuel source and directs the received fuel to an outlet to be dispensed into desired equipment when the fuel dispenser is activated. A pump, either self-contained within the fuel dispenser or located outside the fuel dispenser and coupled to the fuel conduit, provides the pumping force to direct the fuel through the fuel dispenser when activated. Once the fuel is pumped into the fuel conduit inside the fuel dispenser, it encounters a number of fuel handling components located inline the fuel conduit, before eventually being delivered. For example, the fuel encounters a meter to measure the amount of fuel being dispensed. A fuel flow control valve is located inline the fuel conduit either on the inlet or outlet side of the meter, to control whether the fuel is allowed to pass through the fuel conduit to the outlet of the fuel dispenser. The outlet of the fuel dispenser is typically comprised of a flexible hose that is coupled to the fuel conduit on one end and to a nozzle on the other end. A user engages a nozzle handle trigger to allow fuel to flow. The nozzle also contains its own fuel flow control valve that is trigger-activated by the user.

An example of a fuel dispenser that is employed in the aviation industry, in particular for fueling aircraft, is illustrated in FIG. 1A. As shown, a fuel delivery vehicle 10 is provided that contains a fuel delivery assembly 12 installed on a vehicle chassis 14. The fuel delivery vehicle 10 is mobile so that the fuel delivery assembly 12 can be conveniently located proximate the desired aircraft for refueling the aircraft. This is different from typical automobile fuel dispensers that are static and are not transported on trucks or other vehicles. As a result, fuel tanks used to provide fuel to automobile fuel dispensers are located separate from the fuel dispenser, typically beneath the ground. An example of a typical automobile fuel dispenser is described in U.S. Pat. Nos. 5,719,781 and 6,470,233, which are incorporated by reference herein in their entirety. However, a typical automobile fuel dispenser contains similar components and performs similar functionalities to dispenser fuel delivery vehicle 10 with an onboard fuel dispenser assembly 12.

Conventional fuel delivery vehicles 10 may typically fully integrate the fuel delivery assembly 12 into the chassis 14. In this regard, referring now to FIG. 1B, a schematic diagram of the fuel delivery assembly 12 of the conventional fuel delivery vehicle 10 is described. In this conventional arrangement, the entire fuel delivery assembly 12 is mounted onto the chassis 14 of the fuel delivery vehicle 10. The fuel delivery assembly 12 includes a hydraulic pump 16 installed on the chassis 14. A power take-off (PTO) 18 in mechanical communication with a chassis transmission 20 drives the hydraulic pump 16, thereby converting mechanical energy generated by a vehicle engine 22 of the chassis 14 into hydraulic energy. The hydraulic energy is used to drive a hydraulic motor 23, which causes fuel 24 to be pumped by product pump 25 at a rate that is directly proportional to the throughput of the hydraulic pump 16.

The operating speed of the hydraulic pump 16 is also directly proportional to the speed of the vehicle engine 22. Accordingly, the conventional method for changing the flow rate of fuel 24 with a conventional vehicle fuel delivery chassis 12 is to vary the rotational speed (i.e. RPM) of the vehicle engine 22, for example, via control interface 26 located for example in the vehicle cab 28.

This arrangement is limited in that the fuel delivery assembly 12 is generally designed to be permanently installed on the vehicle chassis 14 and thus requires specific design features for each type of vehicle chassis 14. This arrangement also requires the vehicle engine 22 to be continuously monitored and adjusted to maintain a substantially constant flow rate of the fuel 24. Accordingly, there is a need in the art for a more versatile aircraft refueling system.

SUMMARY OF THE DETAILED DESCRIPTION

Embodiments described in the present disclosure include a hydraulic fuel pump apparatus for a fuel delivery chassis, suitable for refueling aircraft, and related devices, systems, and methods. In one exemplary embodiment, a pump module is configured to be connected to a fuel delivery chassis, such as an aircraft fuel delivery vehicle, via a hydraulic pump connected to the chassis motor. A chassis engine is operated at a constant or substantially constant rotation-per minute (RPM) rotational speed, which causes the hydraulic pump to output hydraulic fluid to the pump module at a constant or substantially constant hydraulic pressure. A hydraulic motor is driven by the hydraulic fluid, which in turn drives a fuel pump connected to a fuel reservoir to deliver fuel to one or more fuel outlets. The speed of the hydraulic motor can be varied by a proportional flow control valve disposed between the hydraulic pump and the hydraulic motor, thereby varying the speed of the fuel pump and the flow rate of the fuel. A controller is configured to operate a pressure control valve such that the flow of the fuel is maintained at a predetermined flow rate. The controller is also configured to receive information concerning the actual flow rate of the fuel in the pump module and adjust the pressure control valve in real time to maintain the flow of fuel at the correct flow rate.

One advantage of this arrangement is that the pump module can operate at multiple flow rates while allowing the chassis engine to be maintained at a substantially constant RPM (e.g., at idle). This conserves fuel and reduces wear and tear on the chassis engine, as opposed to systems that control fuel flow rate by varying the speed of the chassis engine, thereby reducing operation and maintenance costs. Another exemplary advantage of this arrangement is that the pump module does not require a direct mechanical connection to the aircraft refueling chassis. This allows the pump module to be easily installed and removed from one or more chassis.

In this regard, in one exemplary embodiment, a pump module for a fuel delivery chassis is disclosed. The pump module comprises a fuel pump configured to pump fuel from a fuel storage receptacle to at least one fuel delivery hose assembly. The pump module also comprises a hydraulic flow control valve configured to receive hydraulic fluid from a hydraulic pump, the hydraulic pump being configured to pump hydraulic fluid at a substantially constant rate such that at least a portion of the hydraulic fluid passes through the hydraulic flow control valve to drive the fuel pump, thereby pumping fuel to the at least one fuel delivery hose assembly. The pump module also comprises a controller configured to maintain a flow rate of fuel from the at least one fuel delivery hose assembly within at least one predetermined flow rate range. The controller is configured to maintain the flow rate of fuel by being configured to first determine a predetermined flow rate range of the at least one predetermined flow rate range. The controller is configured to maintain the flow rate of fuel by being configured to further determine whether the flow rate of fuel is outside the predetermined flow rate range. The controller is configured to maintain the flow rate of fuel by being configured to next control the hydraulic flow control valve to adjust the flow rate of hydraulic fluid such that the flow rate of fuel is adjusted toward the predetermined flow rate range if the flow rate of fuel is outside the predetermined flow rate range.

In another exemplary embodiment, a method of operating a pump module for delivering fuel from a fuel storage receptacle to an aircraft is disclosed. The method comprises providing a fuel pump configured to pump fuel from the fuel storage receptacle to at least one fuel delivery hose assembly. The method also includes providing a hydraulic flow control valve configured to receive hydraulic fluid from a hydraulic pump, the hydraulic pump being configured to pump hydraulic fluid at a substantially constant rate such that at least a portion of the hydraulic fluid passes through the hydraulic flow control valve to drive the fuel pump, thereby pumping fuel to the at least one fuel delivery hose assembly. The method also includes maintaining, via a controller, a flow rate of fuel from the at least one fuel delivery hose assembly within at least one predetermined flow rate range. Maintaining a flow rate of fuel includes determining a predetermined flow rate range of the at least one predetermined flow rate range. Maintaining a flow rate of fuel also includes determining whether the flow rate of fuel is outside the predetermined flow rate range. Maintaining a flow rate of fuel also includes, in response to a determination that the flow rate of fuel is outside the predetermined flow rate range, controlling the hydraulic flow control valve to adjust the flow rate of hydraulic fluid such that the flow rate of fuel is adjusted toward the predetermined flow rate range.

In another exemplary embodiment, a fuel delivery vehicle chassis is disclosed. The chassis includes a fuel storage receptacle, a motor, and a hydraulic pump. The chassis also includes a pump module. The pump module includes a fuel pump configured to pump fuel from the fuel storage receptacle to at least one fuel delivery hose assembly. The pump module also includes a hydraulic flow control valve configured to receive hydraulic fluid from the hydraulic pump, the hydraulic pump being configured to pump hydraulic fluid at a substantially constant rate such that at least a portion of the hydraulic fluid passes through the hydraulic flow control valve to drive the fuel pump, thereby pumping fuel to the at least one fuel delivery hose assembly. The pump module also includes a controller configured to maintain a flow rate of fuel from the at least one fuel delivery hose assembly within at least one predetermined flow rate range with the fuel delivery hose assembly. The controller is configured to maintain the flow rate of fuel by being configured to first determine a predetermined flow rate range of the at least one predetermined flow rate range. The controller is configured to maintain the flow rate of fuel by being configured to next determine whether the flow rate of fuel is outside the predetermined flow rate range. The controller is configured to maintain the flow rate of fuel by being configured to next control the hydraulic flow control valve to adjust the flow rate of hydraulic fluid such that the flow rate of fuel is adjusted toward the predetermined flow rate range if the flow rate of fuel is outside the predetermined flow rate range.

In another exemplary embodiment, a non-transitory computer readable medium is disclosed. The computer readable medium includes instructions for directing a controller to perform a method. The method comprises providing a fuel pump configured to pump fuel from the fuel storage receptacle to at least one fuel delivery hose assembly. The method also includes providing a hydraulic flow control valve configured to receive hydraulic fluid from a hydraulic pump, the hydraulic pump being configured to pump hydraulic fluid at a substantially constant rate such that at least a portion of the hydraulic fluid passes through the hydraulic flow control valve to drive the fuel pump, thereby pumping fuel to the at least one fuel delivery hose assembly. The method also includes maintaining, via a controller, a flow rate of fuel from the at least one fuel delivery hose assembly within at least one predetermined flow rate range. Maintaining a flow rate of fuel includes determining a predetermined flow rate range of the at least one predetermined flow rate range. Maintaining a flow rate of fuel also includes determining whether the flow rate of fuel is outside the predetermined flow rate range. Maintaining a flow rate of fuel also includes, in response to a determination that the flow rate of fuel is outside the predetermined flow rate range, controlling the hydraulic flow control valve to adjust the flow rate of hydraulic fluid such that the flow rate of fuel is adjusted toward the predetermined flow rate range.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments described in the present disclosure include a modular fuel pump apparatus for a fuel delivery chassis, such as aircraft fuel, and related devices, systems, and methods. In one exemplary embodiment, a pump module is configured to be connected to a fuel delivery chassis, such as an aircraft fuel delivery vehicle, via a hydraulic pump connected to the chassis motor. A chassis engine is operated at a constant or substantially constant rotation-per minute (RPM) rotational speed, which causes the hydraulic pump to output hydraulic fluid to the pump module at a constant or substantially constant hydraulic pressure. A hydraulic motor is driven by the hydraulic fluid, which in turn drives a fuel pump connected to a fuel reservoir to deliver fuel to one or more fuel outlets. The speed of the hydraulic motor can be varied by a proportional flow control valve disposed between the hydraulic pump and the hydraulic motor, thereby varying the speed of the fuel pump and the flow rate of the fuel. A controller is configured to operate a pressure control valve such that the flow of the fuel is maintained at a predetermined flow rate. The controller is also configured to receive information concerning the actual flow rate of the fuel in the pump module and adjust the pressure control valve in real time to maintain the flow of fuel at the correct flow rate.

Figure 1A:
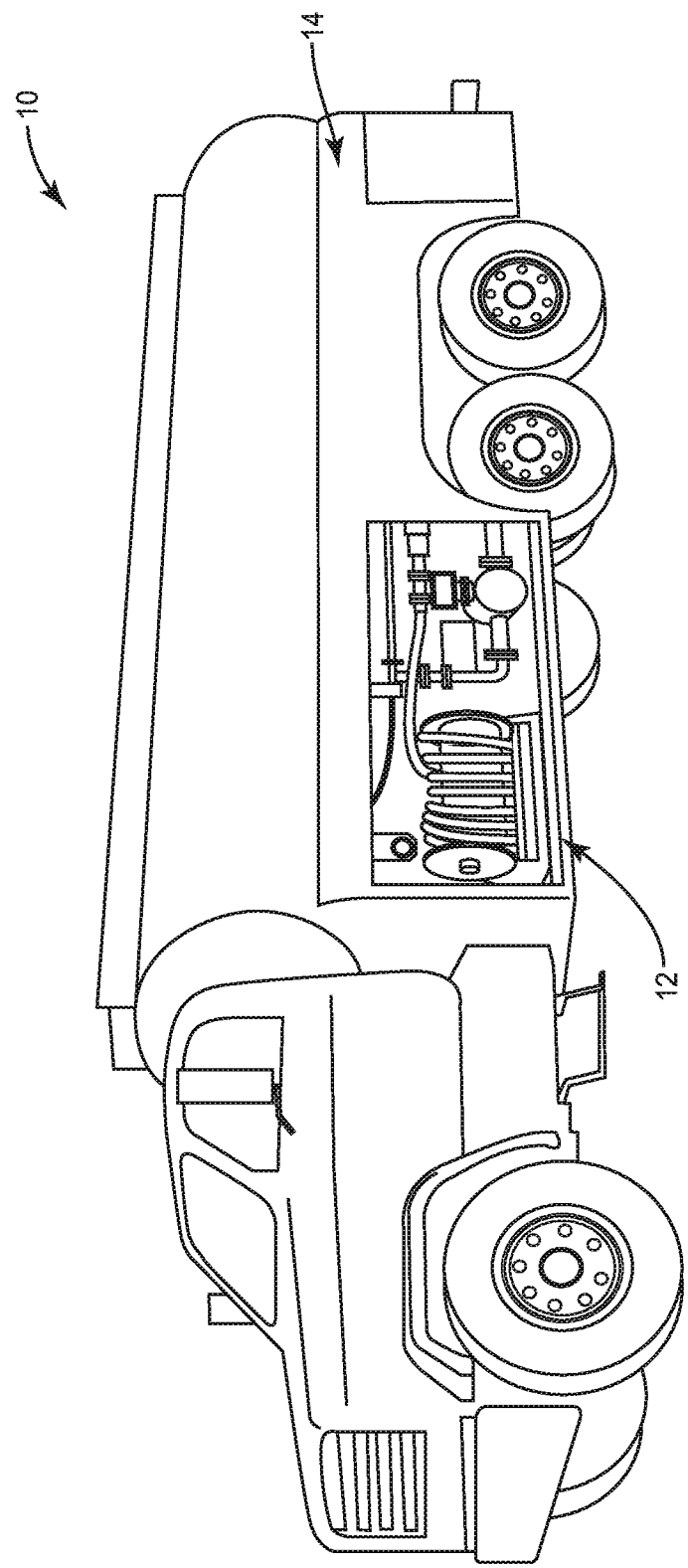
FIG. 1A is an illustration of a conventional fuel delivery vehicle.
Figure 1B:
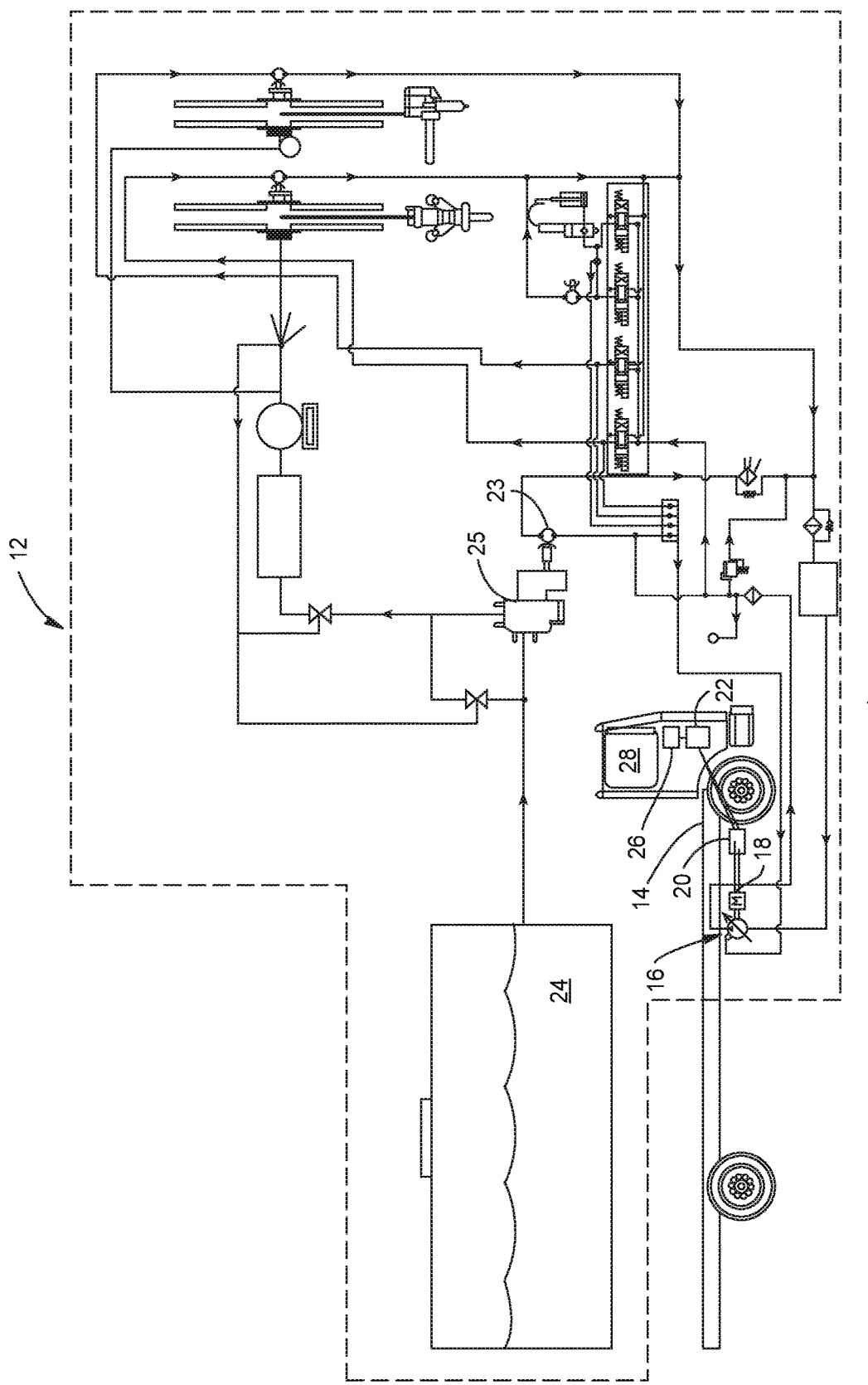
FIG. 1B is a schematic illustration of the components of the conventional fuel delivery vehicle of FIG. 1A wherein fuel flow rate is varied by varying rotational speed of the vehicle engine.

As noted above, the fuel delivery assembly 12 of fuel delivery vehicle 10 of FIGS. 1A and 1B is generally designed and operated as an integrated component of vehicle chassis 14 that varies a flow rate of fuel 24 by varying the rotational speed of the engine 22. One drawback of this arrangement is that running the vehicle engine 22 above idle uses a larger amount of vehicle fuel than running the vehicle engine 22 at idle. Thus, by requiring the vehicle engine 22 to be continuously held above idle to maintain a substantially constant desired flow rate of fuel 24, a significant amount of vehicle fuel is used. In addition, any adjustment to the flow rate of the fuel 24 must be made by changing the RPM of the vehicle engine 22. In general, changing the RPM of the vehicle engine 22 burns more vehicle fuel and causes more wear on the vehicle engine 22 than maintaining the vehicle engine 22 at a substantially constant RPM. Another limitation is that, by installing the fuel assembly 12 on the vehicle chassis 14 as an integrated component, it becomes more difficult to maintain individual parts of the vehicle 10 or assembly 12 without taking the entire vehicle 10 out of use. Thus, this conventional arrangement leads to significant fuel usage by the vehicle 10 and also leads to increased wear and tear on the vehicle 10 and increased maintenance costs.

Figure 2:
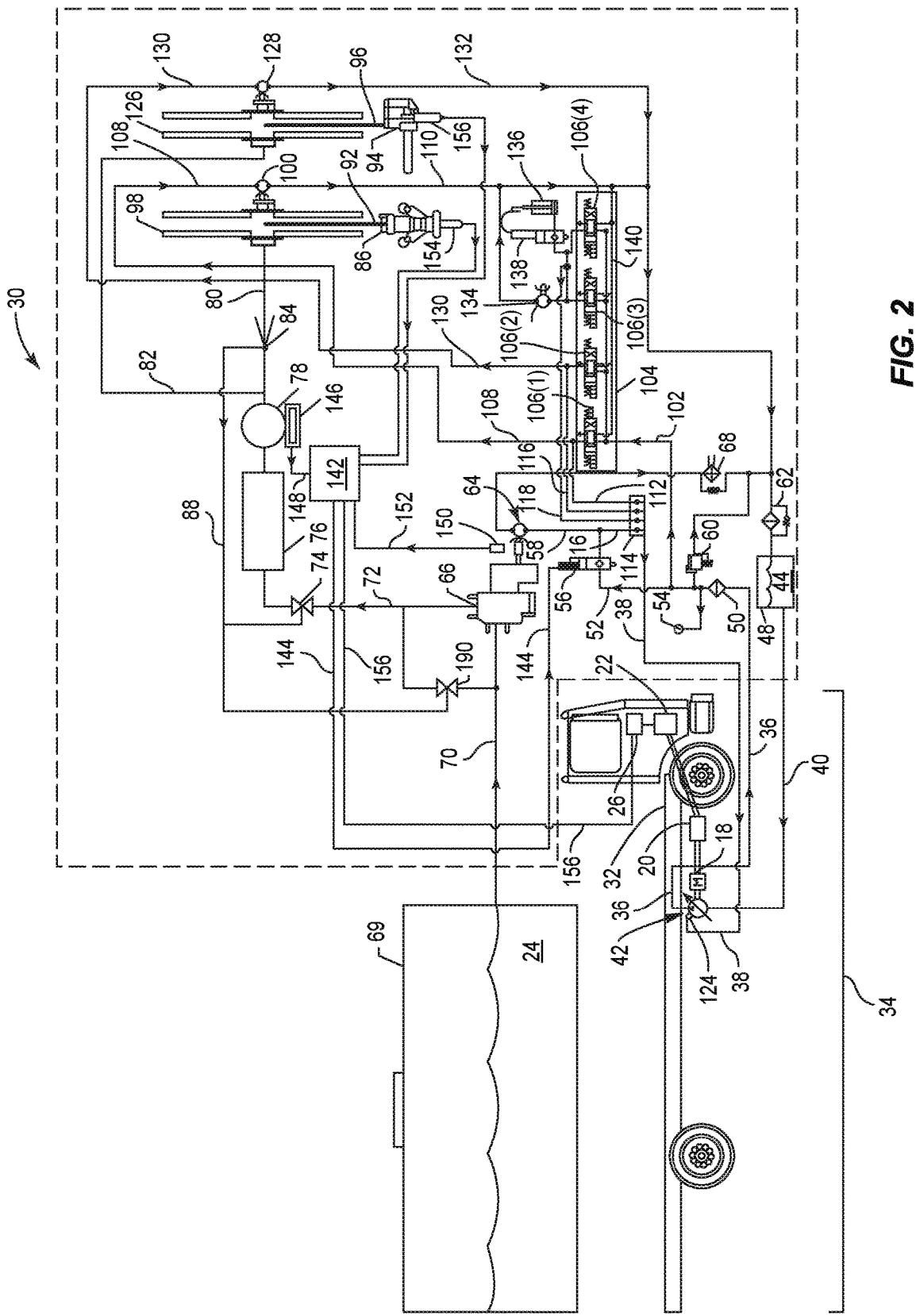
FIG. 2 is a schematic illustration of the components of a pump module for a fuel delivery vehicle wherein the pump module is configured to vary a fuel delivery fuel rate while maintaining a chassis engine at a substantially constant RPM, according to an exemplary embodiment.

These fuel and maintenance costs can be significantly reduced by employing embodiments described herein, which may be designed and operated to maintain the vehicle engine 22 at a constant rotational speed and may also be designed as a chassis-independent module that is easily installed on and removed from different chassis. In this regard, FIG. 2 illustrates a schematic diagram of a pump module 30 for a fuel delivery chassis 32 according to an exemplary embodiment. In this embodiment, the pump module 30 is configured to be mounted onto the chassis 32 of a fuel delivery vehicle 34. The fuel delivery vehicle 34 may be similar to fuel delivery vehicle 10 of FIG. 1, and may include a conventional PTO 18, transmission 20, and/or vehicle engine 22, similar to the vehicle 10 of FIG. 1B. In another embodiment, one or both of the chassis 32 or pump module 30 may be free-standing, and may also be portable and/or mounted in a permanent or semi-permanent installation separate from the chassis 32, as desired.

In this embodiment, hydraulic pump 42 is connected to the PTO 18 by a direct mechanical connection. However, because the hydraulic pump 42 is run at a substantially constant speed by vehicle engine 22, a minimal number of connections between the pump module 30 and the chassis 32 are required. In this embodiment, for example, the only connections between the chassis 32 and pump module 30 required to operate the pump module 30 are main hydraulic outlet line 36, an optional combined pressure control line 38, and hydraulic pump intake line 40, which will be discussed in greater detail below. Because only the hydraulic pump 42 requires a direct mechanical connection to the PTO 18, the entire pump module 30 can be quickly and easily installed, removed or replaced on a given chassis 32, or vice versa.

In this embodiment in FIG. 2, the pump module 30 is configured to deliver hydraulic fluid 44 into hydraulic pump 42 via a hydraulic pump intake line 40 from hydraulic fluid reservoir 48. The pump module 30 is further configured to receive hydraulic fluid 44 from the hydraulic pump 42 via main hydraulic outlet line 36 at a substantially constant flow rate corresponding to a substantially constant optimum (e.g., idle) RPM of the vehicle engine 22, which is 700 RPM in this example. In this embodiment, running the vehicle engine 22 at idle causes the hydraulic pump 42 to generate a maximum amount of hydraulic fluid 44 flow in main hydraulic outlet line 36 required to drive the pump module 30 at a maximum fuel flow rate. It should be understood that the term "substantially constant" allows for small variations from a given speed while remaining substantially constant. For example, the actual speed of the vehicle engine 22 may undergo normal deviations from a specific RPM (e.g., 700 RPM) when idling during normal operation, without adversely affecting operation of the pump module 30, because the hydraulic pump 42 will still output enough hydraulic fluid 44 flow to deliver fuel 24 at a sufficient rate. Thus, by designing the pump module 30 in this manner, the engine 22 never needs to be varied from its optimal rotational speed (e.g., idle) because the fuel flow rate may be varied from within the hydraulic system of pump module 30.

In this regard, hydraulic fluid 44 passes from main hydraulic outlet line 36, through a pressure-side hydraulic filter 50, and into primary hydraulic pump line 52. In this embodiment, hydraulic fluid 44 pressure within primary hydraulic pump line 52 can be manually monitored via a pressure gauge 54. The hydraulic fluid 44 then passes through a proportional flow control valve 56 into the primary hydraulic motor intake line 58. The proportional flow control valve 56 controls the flow rate of fuel 24 by regulating the flow of hydraulic fluid 44 that passes therethrough, with excess hydraulic fluid 44 passing through relief valve 60 and return-side hydraulic filter 62 before returning to the hydraulic fluid reservoir 48.

The hydraulic fluid 44 passing through the hydraulic motor intake line 58 causes primary hydraulic motor 64 to rotate at an RPM proportional to the flow rate of hydraulic fluid 44 passing through the proportional flow control valve 56. The primary hydraulic motor 64 drives product pump 66 to pump fuel at a flow rate proportional to the RPM of the primary hydraulic motor 64. The hydraulic fluid 44 passes through heat exchanger 68 to dissipate excess heat generated by the primary hydraulic motor 64, and passes through return-side hydraulic filter 62 into hydraulic fluid reservoir 48.

Turning now to the product pump 66, fuel 24 is received from fuel storage receptacle 69 by the product pump 66 via product pump intake line 70, and is output to product pump output line 72. The fuel 24 passes through pressure control valve 74, product filter 76 and flowmeter 78 to high and low flow output lines 80, 82. High flow output line 80 passes the fuel 24 through venturi 84 to high flow fuel delivery nozzle 86. Because high flow refueling generates higher pressures that could damage the pump module 30 and/or the aircraft, the venturi 84 is disposed within the high flow output line 80 to permit a small amount of high pressure fuel 24 to pass through venturi pressure control line 88 to pressure control valves 74, 90. If the pressure of the fuel 24 passing through the venturi 84 passes a predetermined threshold, the pressure control valves 74, 90 are activated to regulate the pressure on the product pump output line 72. At the same time, high flow output line 80 delivers fuel 24 to high flow fuel delivery nozzle 86 via high flow fuel delivery hose 92. Low flow output line 82 similarly delivers fuel 24 directly to low flow fuel delivery nozzle 94 via low flow delivery hose 96. Thus, hydraulic pump 42 can deliver a substantially constant flow rate of hydraulic fluid 44 based on an optimum RPM of a vehicle engine 22 while a flow rate of fuel 24 through the pump module 30 can be changed and dynamically regulated in real time via proportional flow control valve 56. This also permits the pump module 30 to be more easily coupled to and decoupled from the chassis 32.

Before discussing the control functions for controlling the proportional flow control valve 56, secondary functions of pump module 30 are discussed. For example, high flow delivery hose 92 is managed by a hose reel 98, which can be connected to a secondary hydraulic motor 100 that is also driven by the hydraulic system of the pump module 30. For example, in this embodiment, a control manifold intake line 102 branches off from primary hydraulic pump line 52 into solenoid control valve manifold 104. The solenoid control valve manifold 104 includes a plurality of solenoid control valves 106(1)-106(4), each corresponding to a secondary function of the pump module 30. In this example, solenoid control valve 106(1) can be selectively opened to permit hydraulic fluid 44 to pass through high flow secondary motor intake line 108 to drive secondary hydraulic motor 100, thereby rotating hose reel 98 to dispense or retract high flow delivery hose 92. The hydraulic fluid 44 then passes through high flow secondary motor return line 110 and through return-side hydraulic filter 62 before returning to hydraulic fluid reservoir 48.

A pressure control line 112 also branches off from high flow secondary motor intake line 108 and into shuttle valve manifold 114. The hydraulic fluid 44 combines with additional hydraulic fluid 44 from additional pressure control lines 116, 118, 120 associated with other functions of the pump module 30, and are transmitted along combined pressure control line 38 into pressure control switch 124 of hydraulic pump 42. Based on the hydraulic fluid 44 pressure measured by the pressure control switch 124, the flow rate of the hydraulic pump 42 is automatically adjusted by the pressure control switch 124 to match the flow rate corresponding to the selected solenoid control valve 106(1)-106(4) and/or primary hydraulic motor 64.

In this embodiment, the solenoid control valve manifold includes four solenoid control valves 106(1)-106(4), each corresponding to a secondary function of pump module 30. Solenoid control valve 106(2) controls rotation of hose reel 126 by transmitting hydraulic fluid 44 to secondary hydraulic motor 128 via low flow secondary motor intake line 130 and back to the hydraulic fluid reservoir 48 via low flow secondary motor return line 132. In this embodiment, solenoid control valve 106(3) can control an optional auxiliary secondary hydraulic motor 134 and solenoid control valve 106(4) can provide hydraulic fluid 44 to other auxiliary equipment such as scissor lift 136, which can be independently controlled by an additional scissor lift solenoid control valve 138. Hydraulic fluid 44 not passing through one of the solenoid control valves 106(1)-106(4) is passed back to the hydraulic fluid reservoir 48 via solenoid control valve manifold return line 140.

Thus, it can be seen from the above embodiment, that hydraulic pump 42 can deliver a substantially constant flow rate of hydraulic fluid 44 based on an optimum RPM of a vehicle engine 22 while a flow rate of fuel 24 through the pump module 30 can be changed and dynamically regulated in real time via proportional flow control valve 56. In this embodiment, operation of the proportional flow control valve 56 is controlled by a programmable logic controller (PLC) 142 using a variety of methods. In one embodiment, the PLC 142 determines an actual flow rate of fuel 24 passing through the product pump output line 72 and compares the determined flow rate with a desired flow rate of fuel 24. If the PLC 142 determines that there is a mismatch, the PLC 142 transmits a control signal 144 to proportional flow control valve 56 to increase or reduce the flow of hydraulic fluid 44 delivered to primary hydraulic motor 64, thereby increasing or reducing the corresponding flow rate of fuel 24 output by product pump 66.

The PLC 142 can determine the actual flow rate of fuel 24 in a number of ways. In this embodiment, a digital register 146 is connected to the flowmeter 78 to measure the flow rate of fuel 24. The digital register 146 can then transmit a register signal 148 to PLC 142 for determining if the actual flow rate of fuel 24 matches a desired flow rate. In this embodiment, the desired flow rate may be fifty (50) gallons-per-minute (GPM) or three hundred (300) GPM, depending on whether high flow or low flow operation is desired, as a non-limiting example. In this embodiment, 50 GPM is a common flow rate for "over wing" refueling of smaller aircraft and 300 GPM is a common flow rate for "under wing" refueling of larger aircraft, but it should be understood that the pump module 30 may be designed to support any number of different flow rates.

In this embodiment, a mechanical register 150 can also be connected to product pump 66 as an alternative or as a supplement to the digital register 146. The mechanical register is configured to measure the flow rate of fuel 24 passing through product pump 66. The mechanical register 150 then transmits its own register signal 152 to PLC 142. In this embodiment, nozzle sensors 154, 156 can also detect when one or the other of the high and low flow fuel delivery nozzles 86, 94 has been removed for use. Since each of the high and low flow fuel delivery nozzles 86, 94 corresponds to a specific desired flow rate (e.g., 300 GPM and 50 GPM respectively), removal of one or the other of the high and low flow fuel delivery nozzles 86, 94 can signal that a corresponding flow rate is desired. This desired flow rate can then be compared to the measured actual flow rate of fuel 24, received via the digital register 146 and/or mechanical register 150, to control the operation of the proportional flow control valve 56. In this manner, the pump module 30 can operate at a plurality of different flow rates while allowing the vehicle engine 22 to be maintained at a substantially constant RPM, e.g., at idle, which conserves vehicle fuel and reduces wear and tear on the vehicle engine 22, thereby reducing operation and maintenance costs.

Other arrangements of the above components are possible. For example, the pump module 30 may have a number of different operation modes, with the above arrangement being a "fixed RPM" mode. In another mode, the PLC 142 can be configured to hold the proportional flow control valve 56 open and vary the flow rate of hydraulic fluid 44 by varying the RPM of the vehicle engine 22, for example via an optional control connection 154 to the vehicle engine 22 via control interface 26 located in the vehicle cab 28 or elsewhere. This "variable RPM" mode operates in a similar manner to the conventional arrangement described above with respect to FIG. 1B, while the availability of the above described "fixed RPM" mode retains the advantages described above with respect to FIG. 2.

The PLC 142 and other components may also be configured to perform additional functions that integrate with the refueling management capabilities of the above described embodiments. For example, the PLC 142 may include one or more remote monitoring processes enabling a user or device to monitor data associated with the pump module 30 and/or chassis 32. Examples of monitored data include vehicle engine 22 RPM, fuel 24 flow rate, total fuel 24 delivered, total fuel usage by the vehicle engine 22, number of duty cycles for the various pumps 42, 66 and motors 64, 100, 128, 134, etc. This data can then be used to optimize usage and maintenance of individual vehicles 34, pump modules 30, and/or fleets of vehicles 34, etc.

In another example, maintenance tasks, such as using regeneration to clean a filter (e.g., a diesel particulate filter), may not be able to be performed proximate to an aircraft or fuel storage receptacle 69 because these tasks involve excess heat and other hazards that would create an unacceptable risk of fuel 24 ignition. Thus, a location-aware system can permit the PLC 142 or other component to determine an optimum location to perform a required regeneration cycle. Thus, it can be seen that, by monitoring this data, the PLC 142 or other components may detect that routine and/or required maintenance, such as a regeneration cycle, is needed, for example, based on a detected state of one or more components.

In another embodiment, this data can be combined with location data, such as global positioning system (GPS) coordinates received from a GPS unit (not shown), to indicate whether certain functions and/or activities may be performed. For example, government regulations may prohibit dispensing of fuel 24 outside of certain specified locations. Thus, if the location information indicates that the pump module 30 is located in a prohibited area within an airport or other facility, the PLC 142 can be instructed to hold the proportional flow control valve 56 closed so that the product pump 66 cannot be operated. Meanwhile, other function managed by the hydraulic system, such as operating hose reels 98, 126, may be permitted by the PLC 142. These and other functions may be implemented in software, hardware or both.

Figure 3:
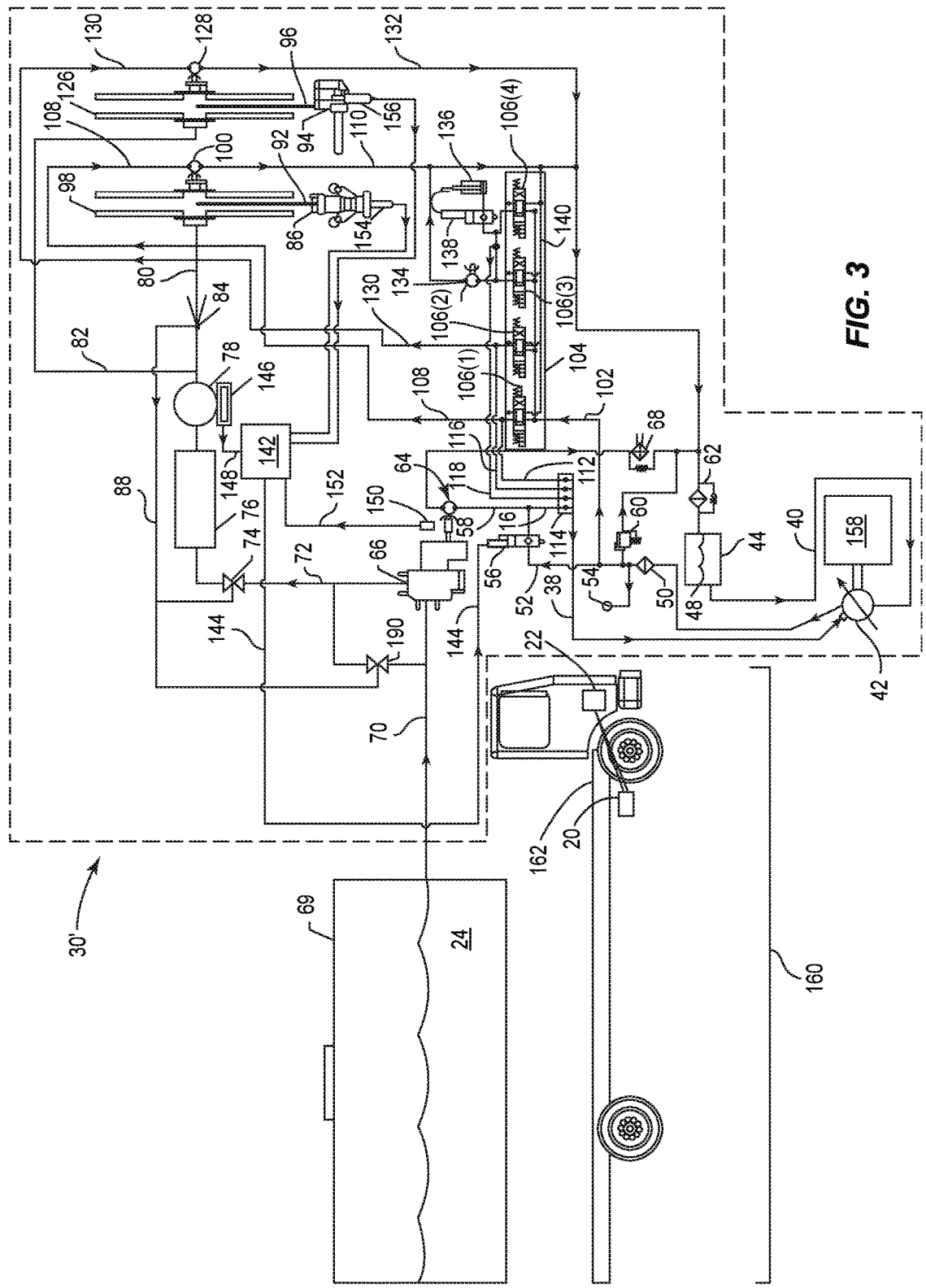
FIG. 3 is a schematic illustration of alternative components of a pump module for a fuel delivery vehicle including an on-board engine and hydraulic pump according to an alternative embodiment.

In other alternate embodiments, the pump module 30 may operate independently of the chassis 32 entirely. In this regard, FIG. 3 illustrates a pump module 30' that includes an on-board engine 158, and fuel delivery vehicle 160 according to an alternative embodiment. For consistency and simplicity, like components will be represented by like reference numerals. In this embodiment, pump module 30' includes a dedicated on-board engine 158, e.g., a diesel engine, and hydraulic pump 42'. In this embodiment, the hydraulic pump 42' is driven by the on-board engine 158 to deliver hydraulic fluid 44 to the primary hydraulic pump line 52. In this embodiment, the operation of pump module 30' may be substantially the same as the operation of pump module 30 of FIG. 2.

In this manner, a pump module 30' can be configured to be entirely self-contained and independent from a vehicle chassis, such as chassis 162 of fuel delivery vehicle 160. One advantage of this arrangement is that both the pump module 30' and fuel delivery vehicle 160 can be modified, replaced, repaired or otherwise maintained independently of the other. Another advantage is that the pump module 30' may be used with a number of different makes and models of vehicles 160 and/or chassis 162. In many conventional arrangements, including a separate on-board diesel or other engine 158 is counterintuitive in light of the availability of the vehicle engine 22 of the vehicle 160 and the widespread use of the vehicle engine 22 in conventional arrangements. However, operating the pump module entirely independently of the fuel delivery vehicle chassis 162 has significant advantages when used as part of pump module 30' that can outweigh the seeming redundancy of this alternative arrangement. For example, in this embodiment, the fuel delivery vehicle 160 may be shut off entirely during refueling, thereby extending the working life of the vehicle engine 22 and other components of the fuel delivery vehicle 160 and reducing lifetime maintenance costs. Meanwhile, the on-board engine 158 may be selected based on the requirements of the pump module 30' alone, and may therefore be more efficient when running at the appropriate RPM to drive the hydraulic pump 42'. For example, because on-board engine 158 does not need to be as powerful as vehicle engine 22, a smaller, more efficient on-board engine 158 can be selected that is more suitable to the specialized operations of pump module 30'.

It is also possible to retrofit existing assemblies, such as fuel delivery vehicle 10, chassis 14 and/or fuel delivery assembly 12 of FIG. 1, to include features of pump modules 30, 30' of FIGS. 1 and 2. For example, a proportional flow control valve 56, PLC 142 and other components could be added to an existing fuel delivery assembly 12 such that the vehicle engine 22 of vehicle 10 could be maintained at idle, with the PLC 142 controlling the flow of fuel 24 via PLC 142, rather than controlling the flow of fuel 24 via vehicle engine 22 from the control interface 26 in vehicle cab 28.

Figure 4:
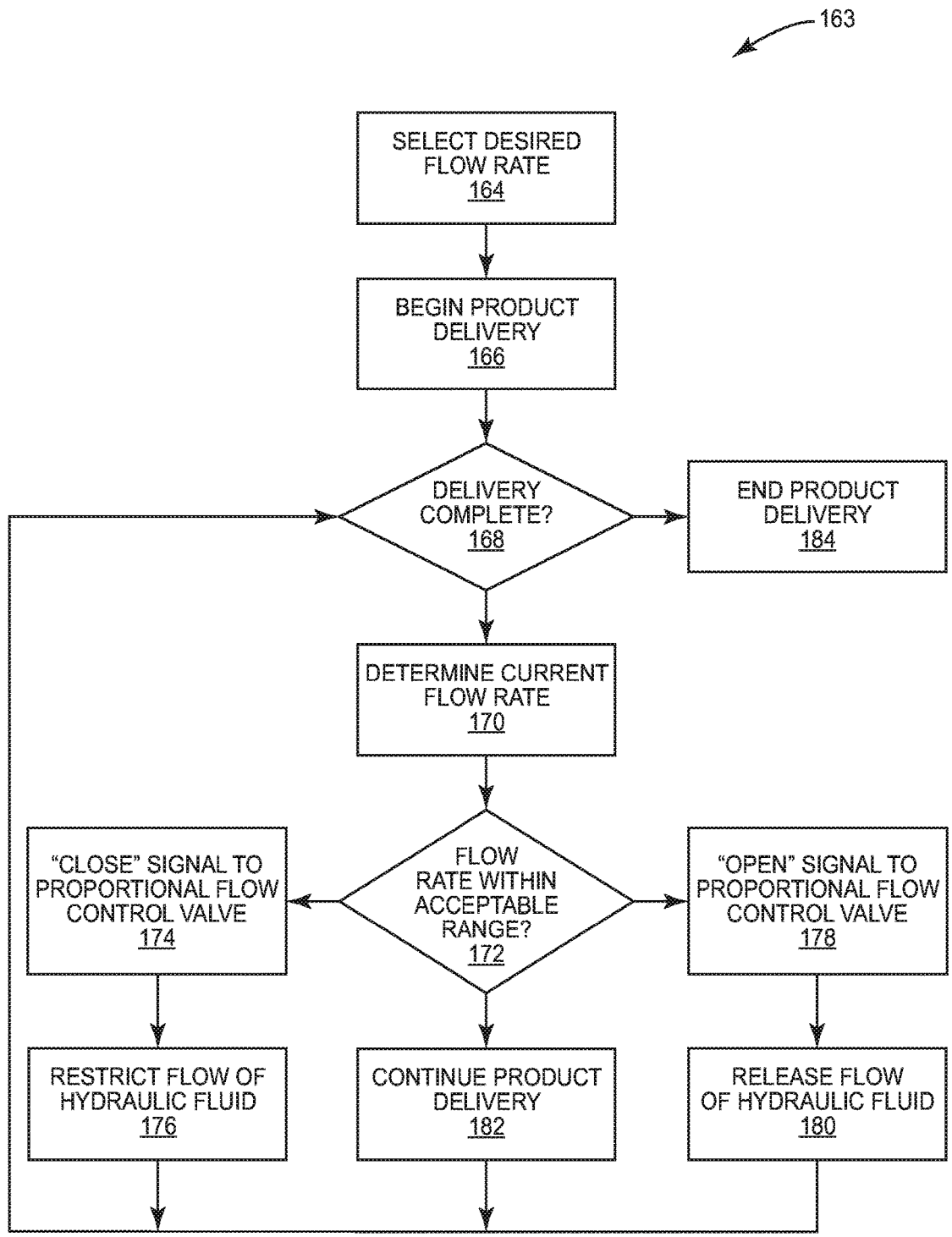
FIG. 4 is a flow chart illustrating an exemplary process for operating a pump module, such as the pump modules in FIGS. 2 and 3.

These and other functions of pump modules 30, 30' of FIGS. 2 and 3 can be performed by a number of different processes. In this regard, FIG. 4 is a flow chart illustrating an exemplary process for operating a pump module, such as the pump modules 30, 30' of FIGS. 2 and 3. In this embodiment, a desired product flow rate, e.g., 50 GPM, 300 GPM, etc., is first selected by a user (block 164) and product delivery begins (block 166). The flow rate is then periodically monitored until delivery is complete. It is first determined whether delivery is complete (block 168). If delivery is not complete, the current product flow rate is determined (block 170). Next, it is determined whether the current product flow rate is within an acceptable range of the selected product flow rate (172). If the flow rate is too high, a corrective "close" signal is transmitted to the proportional flow control valve (block 174), which causes the proportional flow control valve to restrict the flow of hydraulic fluid to the hydraulic motor by a predetermined amount (block 176), thereby slowing the product pump and reducing the product flow rate. The process then returns to block 168.

On the other hand, if the product flow rate is too low, a corrective "open" signal is transmitted to the proportional flow control valve (block 178), which causes the proportional flow control valve to release the flow of hydraulic fluid to the hydraulic motor by a predetermined amount (block 180), thereby increasing the product pump speed and increasing the product flow rate. The process then returns to block 168. If the product flow rate not outside the acceptable range of the selected flow rate, product delivery continues (block 182) and returns to block 168. Once it is determined at block 168 that delivery is complete, product delivery ends (block 184).

Figure 5:
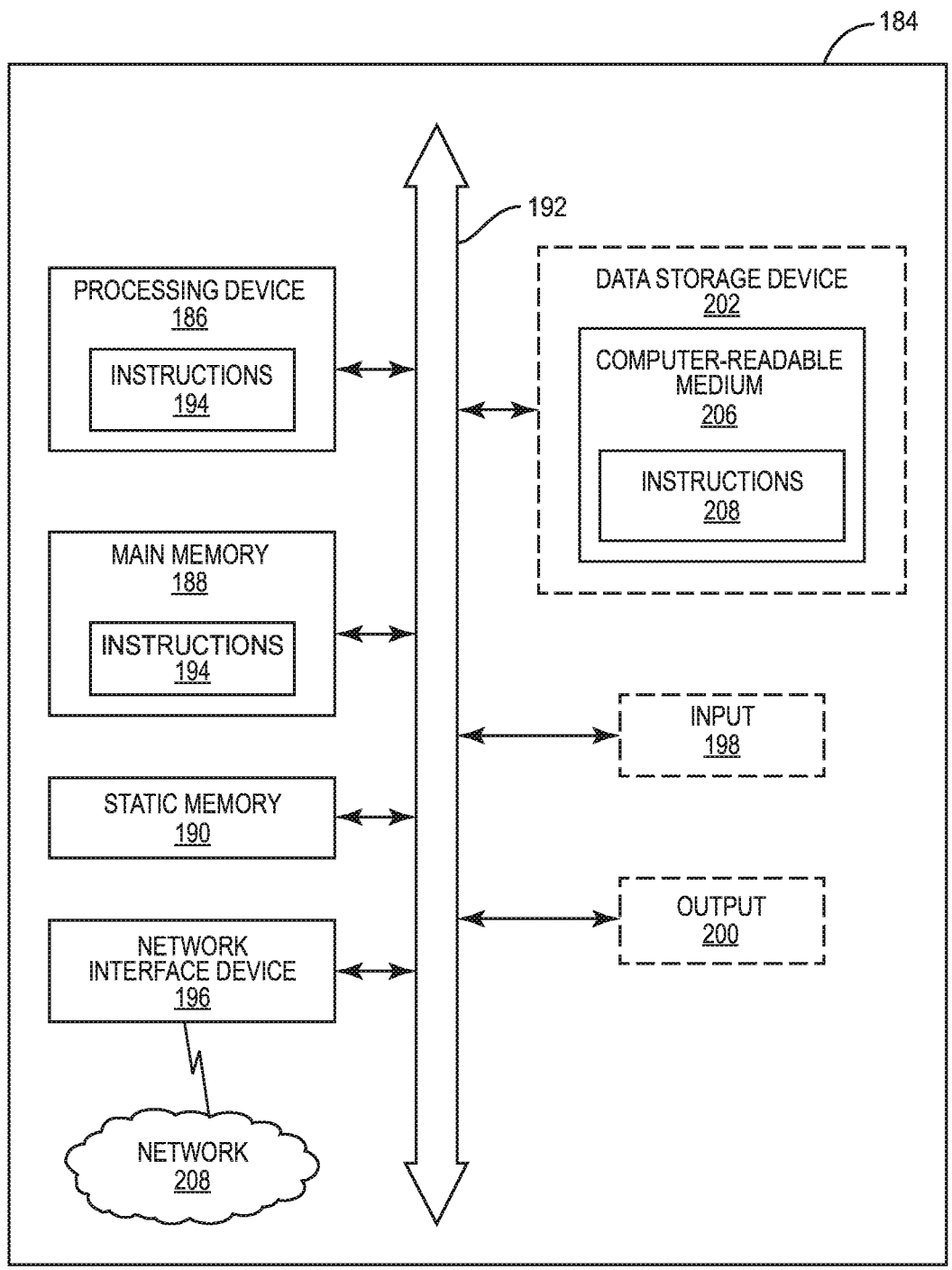
FIG. 5 is a schematic diagram of a generalized representation of an exemplary computer system that can be included in or interface with any of the programmable logic controllers (PLCs) provided in the exemplary pump units and/or their components described herein, wherein the exemplary computer system is adapted to execute instructions from an exemplary computer-readable medium.

These and other processes can be performed by or in association with a computer system included with or associated with any of the pump unit or other components disclosed herein. In this regard, FIG. 5 is a schematic diagram representation of additional detail regarding an exemplary form of an exemplary computer system 184 that is adapted to execute instructions. In this regard, the computer system 184 includes a set of instructions for causing the pump module 30 component(s) to provide its designed functionality. While only a single device is illustrated, the term "device" shall also be taken to include any collection of devices that individually or jointly execute a set (or multiple sets) of instructions to perform any one or more of the methodologies discussed herein. The pump module 30 component(s) may be a circuit or circuits included in an electronic board card, such as a printed circuit board (PCB) as an example, an on-board computer, a server, a personal computer, a desktop computer, a laptop computer, a personal digital assistant (PDA), a computing pad, a mobile device, or any other device, and may represent, for example, a server or a user's computer. The exemplary computer system 184 in this embodiment includes a processing device or processor 186, a main memory 188 (e.g., read-only memory (ROM), flash memory, dynamic random access memory (DRAM) such as synchronous DRAM (SDRAM), etc.), and a static memory 190 (e.g., flash memory, static random access memory (SRAM), etc.), which may communicate with each other via a data bus 192. Alternatively, the processing device 186 may be connected to the main memory 188 and/or static memory 190 directly or via some other connectivity means. The processing device 186 may be a controller, and the main memory 188 or static memory 190 may be any type of memory, each of which can be included in the PLC 142 of FIG. 2.

The processing device 186 represents one or more general-purpose processing devices such as a microprocessor, central processing unit, or the like. More particularly, the processing device 186 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 186 is configured to execute processing logic in instructions 194 (located in the processing device 186 and/or the main memory 188) for performing the operations and steps discussed herein.

The computer system 184 may further include a network interface device 196. The computer system 184 also may or may not include an input 198 to receive input and selections to be communicated to the computer system 184 when executing instructions. The computer system 184 also may or may not include an output 200, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 184 may or may not include a data storage device 202 that includes instructions 204 stored in a computer-readable medium 206. The instructions 204 may also reside, completely or at least partially, within the main memory 188 and/or within the processing device 186 during execution thereof by the computer system 184, the main memory 188 and the processing device 186 also constituting the computer-readable medium 206. The instructions 194, 204 may further be transmitted or received over a network 208 via the network interface device 196.

While the computer-readable medium 206 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A pump module for a fuel delivery chassis, comprising:
   a proportional flow control valve configured to receive hydraulic fluid at a first hydraulic fluid flow rate from a hydraulic pump driven by a vehicle engine, the proportional flow control valve configured to allow at least a portion of the hydraulic fluid to pass through at a second hydraulic fluid flow rate;
   a hydraulic motor configured to receive and be driven by the hydraulic fluid passing through the proportional flow control valve at the second hydraulic fluid flow rate, the hydraulic motor configured to rotate at a rotational rate corresponding to the second hydraulic fluid flow rate;
   a fuel pump configured to be driven by the hydraulic motor, the fuel pump configured to pump fuel from a fuel storage receptacle to at least one fuel delivery hose assembly at a fuel flow rate corresponding to the rotational rate of the hydraulic motor; and
   an electronic controller configured to control the proportional flow control valve to adjust the second hydraulic fluid flow rate to maintain the fuel flow rate within a predetermined flow rate range.

2. The pump module of claim 1, wherein the at least one fuel delivery hose assembly comprises at least two fuel delivery hose assemblies, each having a different associated flow rate range.

3. The pump module of claim 2, wherein the electronic controller is configured to determine the predetermined flow rate range at least in part by determining user selection of one of the at least two fuel delivery hose assemblies.

4. The pump module of claim 1, wherein the hydraulic pump is connected to the vehicle engine such that operation of the vehicle engine at a substantially constant rate drives the hydraulic pump at a substantially constant rate.

5. The pump module of claim 4, wherein the pump module further comprises the vehicle engine and the hydraulic pump.

6. The pump module of claim 1, wherein the pump module is configured to be removably mounted to a fuel delivery vehicle chassis.

7. The pump module of claim 1, wherein the pump module is configured to maintain the fuel flow rate without varying a rotational speed of the vehicle engine.

8. A method of operating a pump module for delivering fuel comprising:
   receiving, at a proportional flow control valve, hydraulic fluid at a first hydraulic fluid flow rate from a hydraulic pump driven by a vehicle engine, the proportional flow control valve allowing at least a portion of the hydraulic fluid to pass through at a second hydraulic fluid flow rate;
   receiving, at a hydraulic motor, the hydraulic fluid passing through the proportional flow control valve at the second hydraulic fluid flow rate, the hydraulic motor rotating at a rotational rate corresponding to the second hydraulic fluid flow rate;
   pumping, by a fuel pump driven by the hydraulic motor, fuel from a fuel storage receptacle to at least one fuel delivery hose assembly at a fuel flow rate corresponding to the rotational rate of the hydraulic motor; and
   controlling, by an electronic controller, the proportional flow control valve to adjust the second hydraulic fluid flow rate to maintain the fuel flow rate within a predetermined flow rate range.

9. The method of claim 8, further comprising determining, by the electronic controller, the predetermined flow rate range at least by determining user selection of one of at least two fuel delivery hose assemblies of the at least one fuel delivery hose assembly, each of the at least two fuel delivery hose assemblies having a different associated flow rate range.

10. The method of claim 8, wherein the hydraulic pump is driven at a substantially constant rate by the vehicle engine driven at a substantially constant rate.

11. The method of claim 8, wherein the pump module is configured to be removably mounted to a fuel delivery vehicle chassis.

12. The method of claim 8, wherein the pump module is configured to maintain the fuel flow rate without varying a rotational speed of the vehicle engine.

13. A fuel delivery vehicle chassis comprising:
a fuel storage receptacle;
a vehicle engine;
a hydraulic pump; and
a pump module comprising:
- a proportional flow control valve configured to receive hydraulic fluid at a first hydraulic fluid flow rate from the hydraulic pump driven by the vehicle engine, the proportional flow control valve configured to allow at least a portion of the hydraulic fluid to pass through at a second hydraulic fluid flow rate;
- a hydraulic motor configured to receive and be driven by the hydraulic fluid passing through the proportional flow control valve at the second hydraulic fluid flow rate, the hydraulic motor configured to rotate at a rotational rate corresponding to the second hydraulic fluid flow rate;
- a fuel pump configured to be driven by the hydraulic motor, the fuel pump configured to pump fuel from a fuel storage receptacle to at least one fuel delivery hose assembly at a fuel flow rate corresponding to the rotational rate of the hydraulic motor; and
- an electronic controller configured to control the proportional flow control valve to adjust the second hydraulic fluid flow rate to maintain the fuel flow rate within a predetermined flow rate range.

14. The fuel delivery vehicle chassis of claim 13, wherein the at least one fuel delivery hose assembly comprises at least two fuel delivery hose assemblies, each having a different associated flow rate range.

15. The fuel delivery vehicle chassis of claim 14, wherein the electronic controller is configured to determine the predetermined flow rate range at least in part by determining user selection of one of the at least two fuel delivery hose assemblies.

16. The fuel delivery vehicle chassis of claim 13, wherein the hydraulic pump is connected to the vehicle engine such that operation of the vehicle engine at a substantially constant rate drives the hydraulic pump at a substantially constant rate.

17. The fuel delivery vehicle chassis of claim 13, wherein the pump module is configured to be removably mounted to a fuel delivery vehicle chassis.

18. The pump module of claim 13, wherein the pump module is configured to maintain the fuel flow rate without varying a rotational speed of the vehicle engine.

19. A pump module for a fuel delivery chassis, comprising:
- a proportional flow control valve configured to receive hydraulic fluid at a first hydraulic fluid flow rate from a hydraulic pump driven by a vehicle engine, the proportional flow control valve configured to allow at least a portion of the hydraulic fluid to pass through at a second hydraulic fluid flow rate;
- a fuel pump configured to pump fuel from a fuel storage receptacle to at least one fuel delivery hose assembly at a fuel flow rate corresponding to the second hydraulic fluid flow rate; and
- an electronic controller configured to control the proportional flow control valve to adjust the second hydraulic fluid flow rate to maintain the fuel flow rate within a predetermined flow rate range.

20. The pump module of claim 19, further comprising a hydraulic motor configured to receive and be driven by the hydraulic fluid passing through the proportional flow control valve at the second hydraulic fluid flow rate.

21. The pump module of claim 20, the fuel pump configured to be driven by the hydraulic motor.

22. The pump module of claim 19, wherein the pump module is configured to maintain the fuel flow rate without varying a rotational speed of the vehicle engine.

* * * * *